(12) United States Patent
Kobayashi et al.

(10) Patent No.: US 11,735,840 B2
(45) Date of Patent: Aug. 22, 2023

(54) ELECTRICAL CONNECTION BOX

(71) Applicant: Yazaki Corporation, Tokyo (JP)

(72) Inventors: Kazuki Kobayashi, Shizuoka (JP);
Kohei Toyoshima, Shizuoka (JP);
Kenji Segawa, Shizuoka (JP);
Masahiro Fujiwara, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 42 days.

(21) Appl. No.: 17/696,894

(22) Filed: Mar. 17, 2022

(65) Prior Publication Data

US 2022/0302610 A1    Sep. 22, 2022

(30) Foreign Application Priority Data

Mar. 18, 2021   (JP) ................. 2021-044207

(51) Int. Cl.
*H01R 9/24*    (2006.01)
*H01R 4/30*    (2006.01)
*H01R 11/12*   (2006.01)

(52) U.S. Cl.
CPC ......... *H01R 9/2416* (2013.01); *H01R 9/2491* (2013.01); *H01R 4/30* (2013.01); *H01R 11/12* (2013.01)

(58) Field of Classification Search
CPC .............. H01R 9/2416; H01R 13/5812; B60R 16/0238; B60R 16/02; H02G 3/16
See application file for complete search history.

(56) References Cited

FOREIGN PATENT DOCUMENTS

JP    2009-278741 A    11/2009
KR    2015-0136425 A    12/2015

*Primary Examiner* — Ross N Gushi
(74) *Attorney, Agent, or Firm* — Kenealy Vaidya LLP (57) ABSTRACT

An electrical connection box is provided with a conductive bus bar, an insulating housing body, a cover, and a power supply line. The cover opens or closes with respect to the housing body at a fully open position and a fully closed position. The housing body has a connector at a position exposed to the outside, with the connector configured so that a terminal provided at a tip of the power supply line is attachable or detachable to or from the connector. A restriction portion, which restricts the power supply line from moving in the longitudinal direction is provided in the cover. In the state where the terminal is connected to the connector, the tension is created on the power supply line in the longitudinal direction by the restriction portion during moving the cover from the fully closed position to the fully open position side.

3 Claims, 8 Drawing Sheets

ELECTRICAL CONNECTION BOX

CROSS-REFERENCE TO RELATED APPLICATION(S)

The present application claims priority to and incorporates by reference the entire contents of Japanese Patent Application No. 2021-044207 filed in Japan on Mar. 18, 2021.

BACKGROUND OF THE INVENTION

1. Field of the Invention

The present invention relates to an electrical connection box.

2. Description of the Related Art

Some electrical connection boxes include a conductive bus bar, an insulating housing that stores the bus bar in its internal storing space, a component attaching portion that is exposed to the outside of the housing, and an electric wire that electrically connects the component attaching portion with the bus bar (see, e.g., Japanese Patent Application Laid-open No. 2009-278741 A).

Further, some electrical connection boxes include the conductive bus bar, the insulating housing that stores the bus bar in its internal storing space, a cover that opens or closes between an open state that the bus bar is exposed to the outside and a closed state that the bus bar is blocked from the outside, and a power supply line that supplies the bus bar with electric power. In this electrical connection box, the housing has a connector at a position exposed to the outside, with the connector configured so that a terminal provided at the tip of the power supply line is attachable or detachable to or from the connector. Then, attaching the terminal to the connector causes the electric power from a power supply to be supplied to electrical devices.

However, the electrical connection box mentioned above has a possibility that the cover opens or closes with respect to the housing regardless of the connection state between the terminal and the connector.

SUMMARY OF THE INVENTION

The present invention is made in view of the circumstances mentioned above and provides an electrical connection box capable of restricting the cover from moving to the fully open position depending on the connection state between the terminal and the connector.

In order to solve the above mentioned problem and achieve the object, an electrical connection box according to one aspect of the present invention includes a bus bar having conductivity; a housing body having an insulation property configured to store the bus bar in a storing space inside the housing body; a cover configured to open or close with respect to the housing body at a fully open position where the bus bar is exposes to outside and a fully closed position where the bus bar is blocked from the outside; and a power supply line configured to supply the bus bar with electric power, wherein the housing body has a connector provided at a position exposed to the outside, the connector being configured so that a terminal provided at a tip of the power supply line is attachable or detachable to or from the connector, the cover is provided with a restriction portion that restricts the power supply line from moving in a longitudinal direction, and tension is created on the power supply line in the longitudinal direction by the restriction portion during moving the cover from the fully closed position to the fully open position side in a state where the terminal is connected to the connector.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of an electrical connection box according to the present invention are now described with reference to the drawings. Note that the present invention is not limited to the embodiments. In addition, the constitutional components in the following embodiments include those easily conceivable by those skilled in the art or substantially the same.

Figure 1:
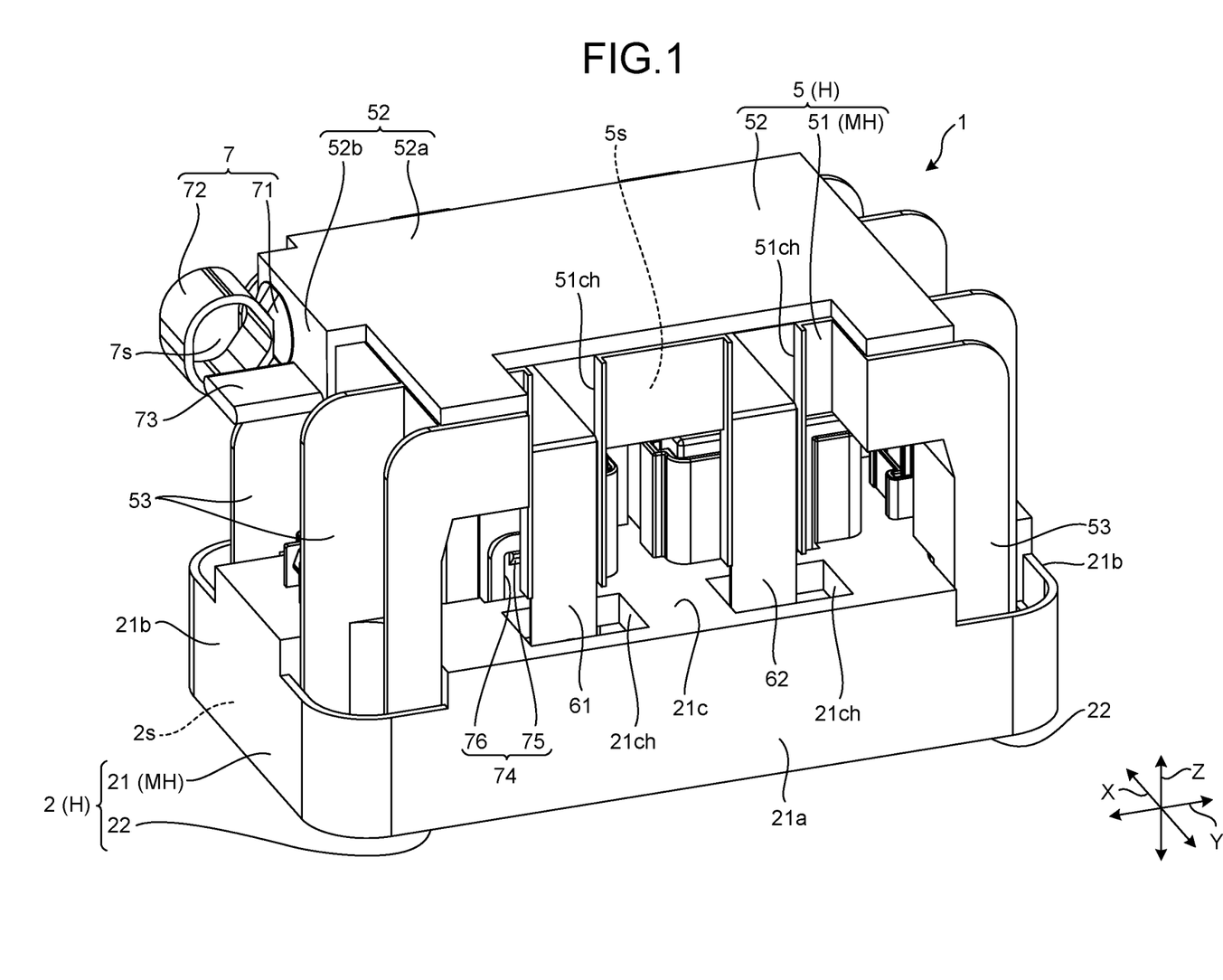
FIG. 1 is a perspective view of an electrical connection box according to a first embodiment.
Figure 2:
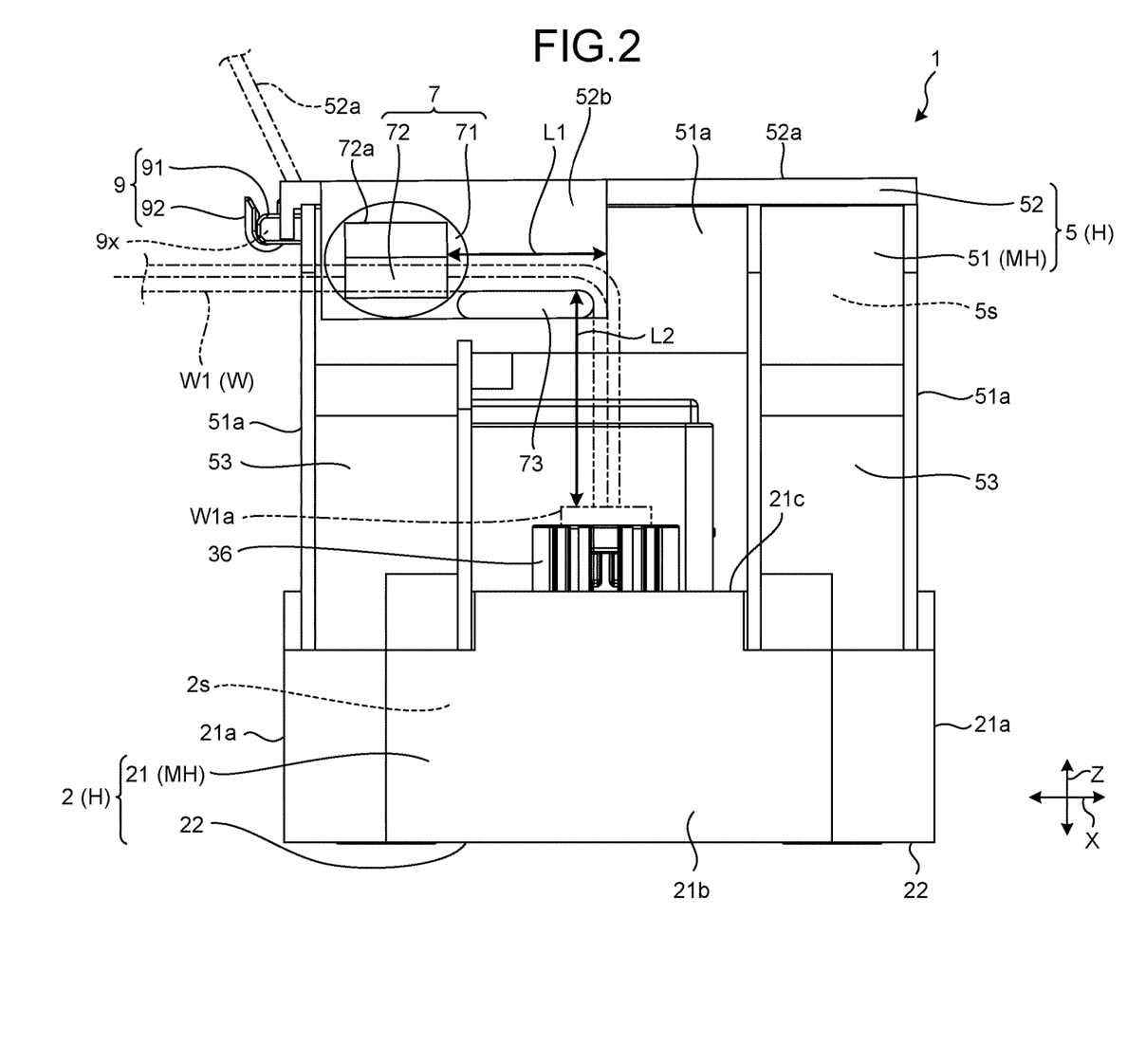
FIG. 2 is a side view of the electrical connection box according to the first embodiment in a state where a branch box housing cover moves to a fully closed position with respect to a branch box housing body.
Figure 3:
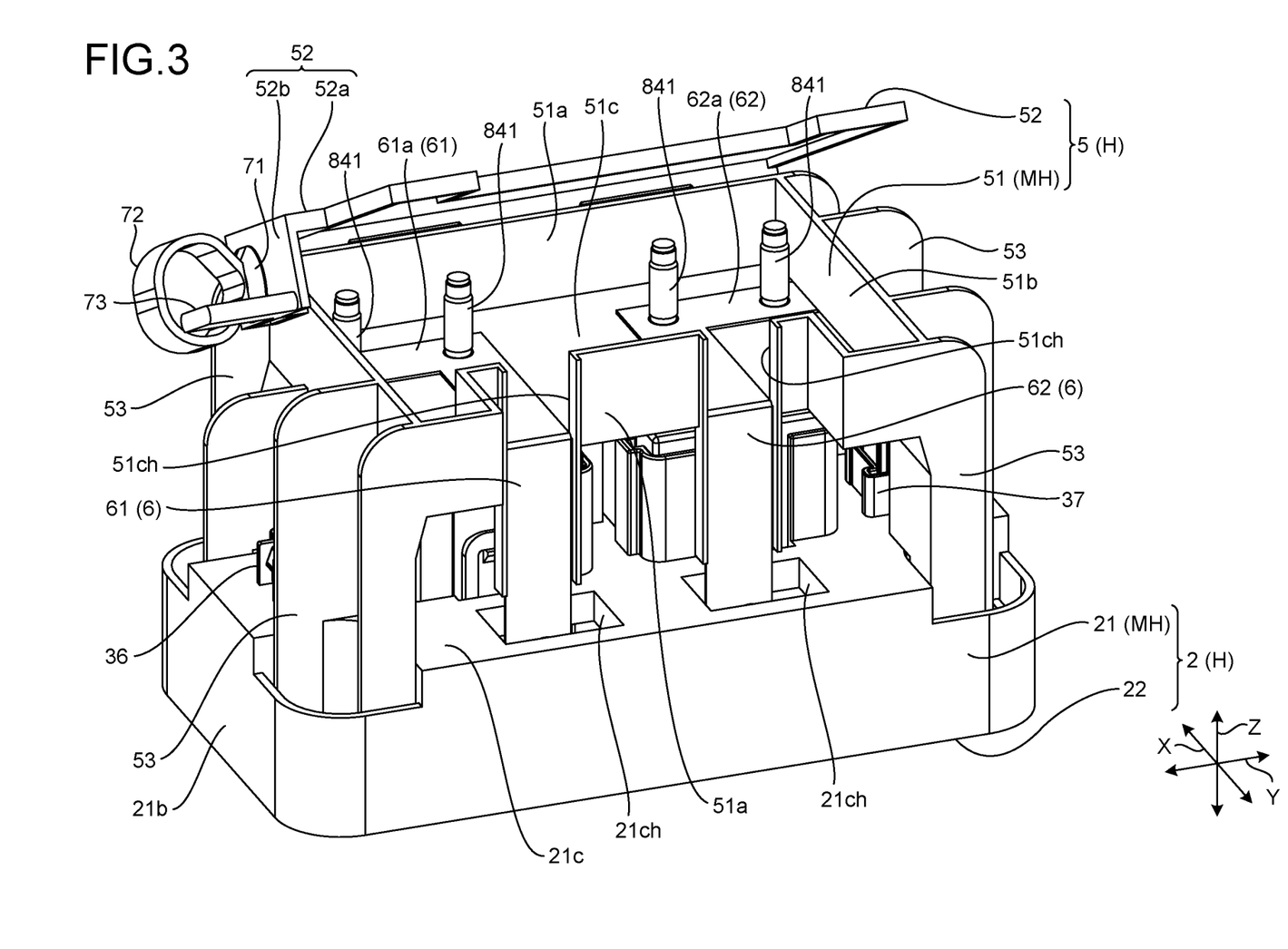
FIG. 3 is a perspective view of the electrical connection box according to the first embodiment in a state where the branch box housing cover moves to an intermediate position between the fully closed position and a fully open position with respect to the branch box housing body.
Figure 4:
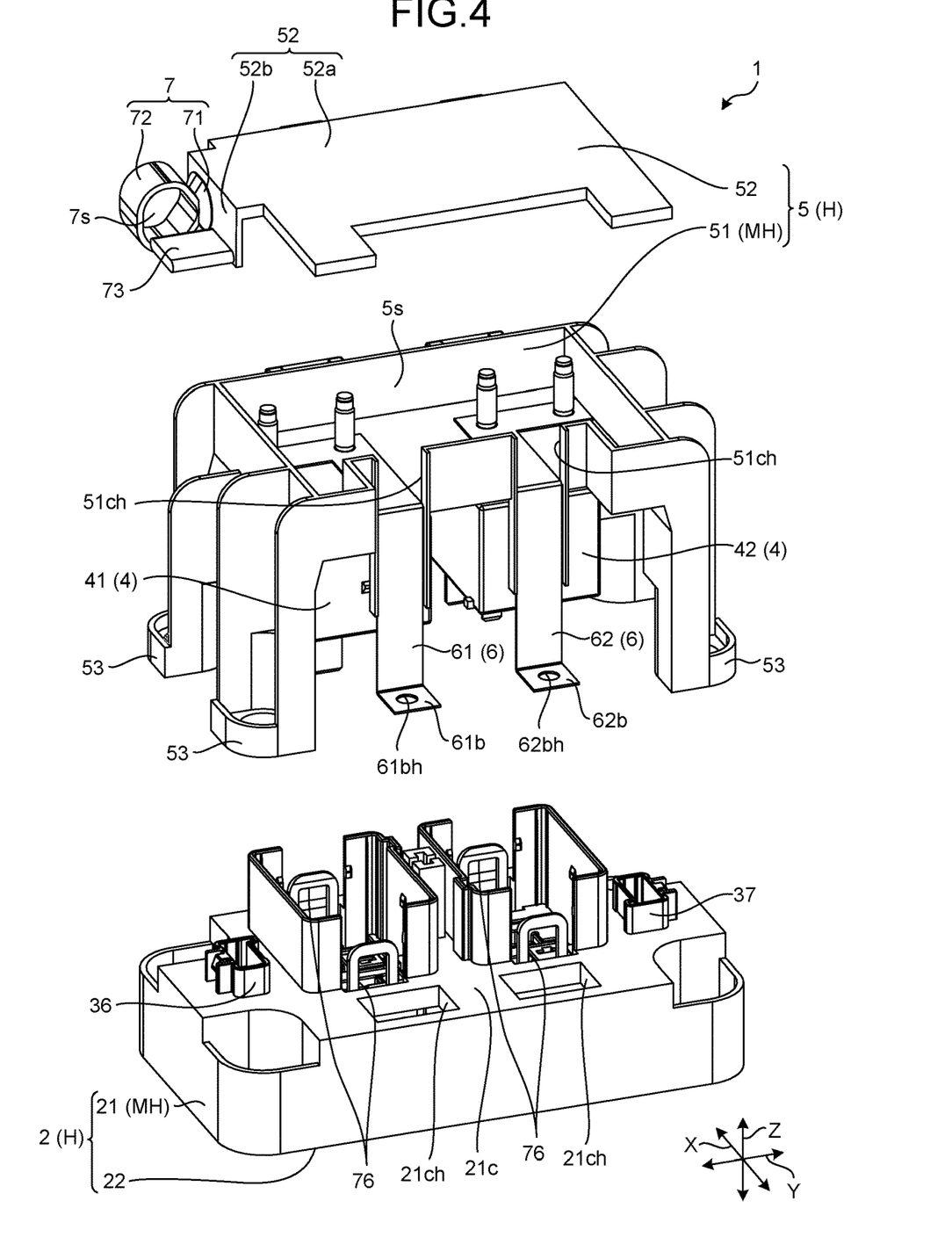
FIG. 4 is an exploded perspective view of the electrical connection box according to the first embodiment.
Figure 5:
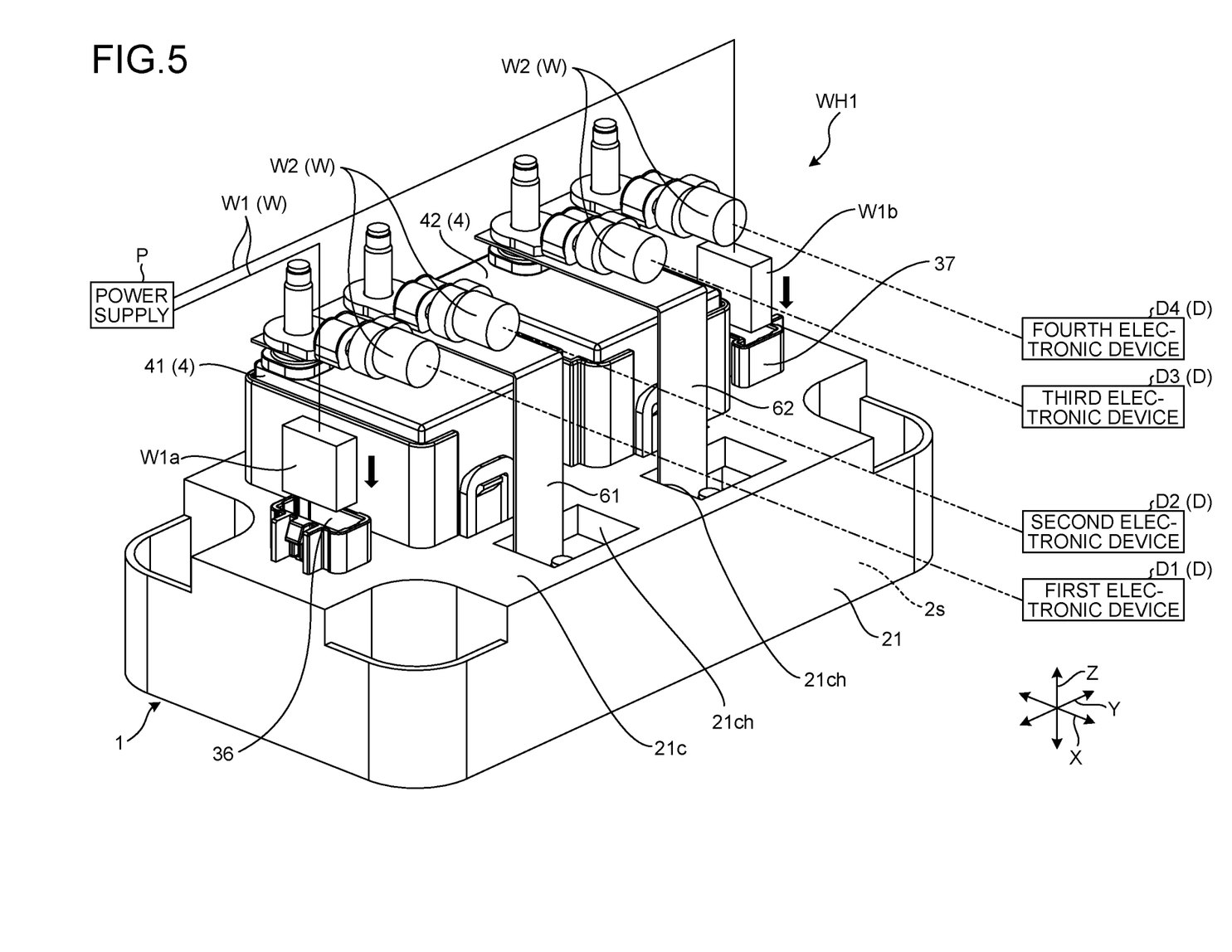
FIG. 5 is a perspective view illustrating the inside of a branch box housing according to the first embodiment.
Figure 6:
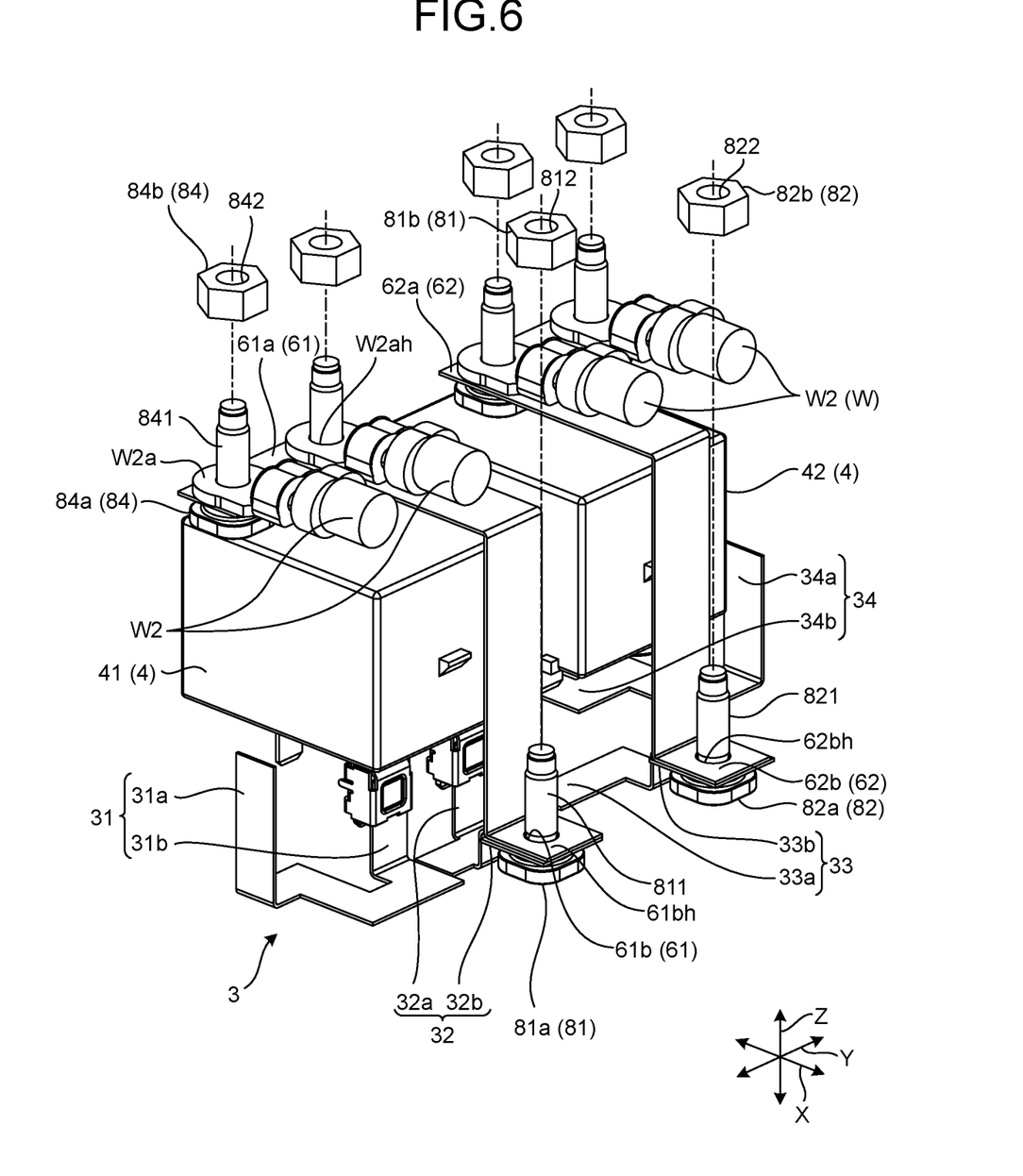
FIG. 6 is a perspective view illustrating a connection box bus bar and a branch box bus bar according to the first embodiment.

FIG. 1 is a perspective view of an electrical connection box 1 according to a first embodiment. FIG. 2 is a side view of the electrical connection box 1 according to the first embodiment in a state where a branch box housing cover 52 moves to a fully closed position with respect to a branch box housing body 51. FIG. 3 is a perspective view of the electrical connection box 1 according to the first embodiment in a state where the branch box housing cover 52 moves to an intermediate position between the fully closed position and a fully open position with respect to the branch box housing body 51. FIG. 4 is an exploded perspective view of the electrical connection box 1 according to the first embodiment. FIG. 5 is a perspective view illustrating the inside of a branch box housing body 51 according to the first embodiment. FIG. 6 is a perspective view illustrating a connection box bus bar 3 and a branch box bus bar 6 according to the first embodiment.

Further, in FIGS. 1 to 6, Z represents the vertical direction of the electrical connection box 1, X represents a first orthogonal direction orthogonal to the vertical direction Z in the electrical connection box 1, and Y represents a second orthogonal direction orthogonal to the vertical direction Z and the first orthogonal direction X in the electrical connection box 1. The first orthogonal direction X, the second orthogonal direction Y, and the vertical direction Z are orthogonal to each other.

First Embodiment

The electrical connection box 1 according to the present embodiment illustrated in FIG. 1 is installed in a vehicle such as an automobile and incorporated into a wire harness WH1. The wire harness WH1 is, for example, used for connection with respective electronic devices D (see FIG. 5) installed in a vehicle. The wire harness WH1 is an assembled part in which a plurality of wiring materials W for the power supply or signal communication is bundled and is used for connecting the plurality of wiring materials W to the respective electronic devices D using a connector or the like. The wire harness WH1 includes the conductive wiring material W and the electrical connection box 1 that is electrically connected to the wiring material W. The wiring material W includes, for example, a metal rod, an electric wire, an electric wire bundle, or the like. The metal rod includes a conductive rod-shaped member having an outer side covered with an insulating covering portion. The electric wire includes a conductor portion (core wire) having an outer side covered with an insulating covering portion, and the conductor portion is made of a plurality of conductive metal strands. The electric wire bundle is a bundle of electric wires. In the wire harness WH1, the plurality of wiring materials W is bundled and tied, and the electrical connection box 1 is electrically connected to the wire harness through a connector or the like provided at the end portion of the bundled wiring materials W. The wire harness WH1 can further include a grommet, a protector, an exterior material, a fixture, and the like.

The electrical connection box 1 is an assembled part of electrical components such as connectors, fuses, relays, capacitors, branch portions, and electronic controllers, which are stored therein. The electrical connection box 1 is installed in, for example, the engine room or the interior of a vehicle. The electrical connection box 1 is connected between a power supply P such as a battery or a generator and various electronic devices D attached to the inside of the vehicle through a power supply line W1 and an electric wire W2 included in the wiring material W, as illustrated in FIG. 5. The electrical connection box 1 distributes the electric power supplied from the power supply P to the various electronic devices D in the vehicle. More specifically, the electrical connection box 1 uses a first electronic device D1 described later to distribute the electric power supplied from the power supply P to the first electronic device D1 and a second electronic device D2. In addition, the electrical connection box 1 uses the second electronic device D2 described later to distribute the electric power supplied from the power supply P to a third electronic device D3 and a fourth electronic device D4. The electrical connection box 1 is also referred to as a junction box, a fuse box, a relay box, or the like in some cases, but in the present embodiment, these are collectively referred to as the electrical connection box 1. The configuration of the electrical connection box 1 is now described in detail with reference to each drawing.

The electrical connection box 1 is provided with an insulating housing H illustrated in FIG. 1. The housing H of the present embodiment includes a connection box housing 2 and a branch box housing 5. The connection box housing 2 includes a conductive connection box bus bar 3 and an insulating connection box housing body 21 that stores the connection box bus bar 3 in a connection box storing space 2s inside the insulating connection box housing body 21 (see FIG. 6). The branch box housing 5 includes a conductive branch box bus bar 6 and an insulating branch box housing body 51 that stores the branch box bus bar 6 in a branch box storing space 5s inside the insulating branch box housing body 51 (see FIG. 6). The connection box bus bar 3 and the branch box bus bar 6 form a bus bar B. The connection box housing body 21 and the branch box housing body 51 form a housing body BH. In other words, the electrical connection box 1 includes the conductive bus bar B and the insulating housing body MH that stores the bus bar B in the storing spaces 2s and 5s inside each insulating housing body MH.

The connection box housing 2 has the connection box housing body 21, which forms the connection box storing space 2s, and a connection box housing bottom portion 22 as illustrated in FIG. 1. The connection box housing body 21 has a pair of first connection box housing-facing walls 21a, a pair of second connection box housing-facing walls 21b, and a connection box housing top portion 21c. The pair of first connection box housing-facing walls 21a faces each other in the first orthogonal direction X. The pair of second connection box housing-facing walls 21b faces each other in the second orthogonal direction Y. The connection box housing top portion 21c faces the connection box housing bottom portion 22 in the vertical direction Z.

The connection box housing top portion 21c is located above the connection box housing 2 in the vertical direction Z. Then, the connection box housing top portion 21c is provided with first and second connectors 36 and 37 and two top through-holes 21ch. The first connector 36 and the second connector 37 are provided on the connection box housing top portion 21c while being exposed to the outside in a state where the branch box housing 5 is attached to the connection box housing 2. Each of the top through-holes 21ch penetrates the connection box housing top portion 21c in the vertical direction Z, communicating the connection box storing space 2s with the outside.

The connection box bus bar 3 includes a first connection box bus bar 31, a second connection box bus bar 32, a third connection box bus bar 33, and a fourth connection box bus bar 34, as illustrated in FIG. 6. In addition, the connection box housing 2 according to the present embodiment includes a plurality of electronic components 4 so that a part of each of the electronic components 4 is exposed from above, as illustrated in FIG. 5. Then, the electronic component 4 according to the present embodiment includes a first electronic component 41 and a second electronic component 42.

The first connection box bus bar 31 has a tip portion 31a electrically connected to the first connector 36 (see FIG. 5). The first connector 36 is attachable or detachable to or from a first terminal W1a provided at the end of the power supply line W1 connected to the power supply P as illustrated in FIG. 5. The first connection box bus bar 31 has another tip portion 31b electrically connected to the first electronic component 41, as illustrated in FIG. 6.

The second connection box bus bar 32 has a tip portion 32a electrically connected to the first electronic component 41. The second connection box bus bar 32 has another tip portion 32b with a through-hole that penetrates the tip portion 32b in the vertical direction Z. Then, the tip portion 32b is brought into direct contact with a tip portion 61b of a first branch box bus bar 61 described later. In addition, the tip portion 61b has a through-hole 61bh that penetrates the tip portion 61b in the vertical direction Z (see FIG. 4). Then, a screw portion 811 of a first bolt 81a in a first bus bar fastening member 81 is inserted into a through-hole of the tip portion 32b and a through-hole 61bh of the tip portion 61b so that the tip portion 32b and the tip portion 61b are brought into direct contact with each other. In this state, screwing the screw portion 811 of the first bolt 81a into a screw hole 812 of a first nut 81b fastens the tip portion 32b to the tip portion 61b together using the first bus bar fastening member 81. In other words, the tip portion 32b of the second connection box bus bar 32 and the tip portion 61b of the first branch box bus bar 61 are brought into direct contact with each other. The second connection box bus bar 32 and the first branch box bus bar 61 are electrically connected by fastening the tip portion 32b and the tip portion 61b together in a state where the tip portion 32b and the tip portion 61b are in direct contact with each other using the first bus bar fastening member 81.

The first bus bar fastening member 81 includes the first bolt 81a and the first nut 81b. The first nut 81b has the screw hole 812 screwed into the screw portion 811 of the first bolt 81a.

The third connection box bus bar 33 has a tip portion 33a electrically connected to the second electronic component 42. The third connection box bus bar 33 has another tip portion 33b with a through-hole that penetrates the tip portion 33b in the vertical direction Z. Then, the tip portion 33b is brought into direct contact with a tip portion 62b of a second branch box bus bar 62 described later. The tip portion 62b has a through-hole 62bh that penetrates the tip portion 62b in the vertical direction Z (see FIG. 4). Then, a screw portion 821 of a second bolt 82a in a second bus bar fastening member 82 is inserted into a through-hole of the tip portion 33b and a through-hole 62bh of the tip portion 62b so that the tip portion 33b and the tip portion 62b are brought into direct contact with each other. In this state, screwing the screw portion 821 of the second bolt 82a into a screw hole 822 of a second nut 82b fastens the tip portion 33b to the tip portion 62b together using the second bus bar fastening member 82. In other words, the tip portion 33b of the third connection box bus bar 33 and the tip portion 62b of the second branch box bus bar 62 are brought into direct contact with each other. The third connection box bus bar 33 and the second branch box bus bar 62 are electrically connected by fastening the tip portion 33b and the tip portion 62b together in a state where the tip portion 33b and the tip portion 62b are in direct contact with each other using the second bus bar fastening member 82.

The second bus bar fastening member 82 includes the second bolt 82a and the second nut 82b. The second nut 82b has the screw hole 822 screwed into the screw portion 821 of the second bolt 82a.

The fourth connection box bus bar 34 has a tip portion 34a electrically connected to the second connector 37 (see FIG. 5). The second connector 37 is attachable or detachable to or from a second terminal W1b provided at the end of the power supply line W1 connected to the power supply P as illustrated in FIG. 5. The fourth connection box bus bar 34 has another tip portion 34b electrically connected to the second electronic component 42, as illustrated in FIG. 6.

The first electronic component 41 and the second electronic component 42 are, for example, relays. More specifically, the first electronic component 41 distributes the electric power supplied from the power supply P to the first electronic device D1 and the second electronic device D2 as necessary. In addition, the second electronic component 42 distributes the electric power supplied from the power supply P to the third electronic device D3 and the fourth electronic device D4 as necessary.

The connection box housing body 21 and each electronic component 4 are provided with a locking mechanism 74 that locks each electronic component 4 to the connection box housing body 21. The locking mechanism 74 includes, for example, a locking claw 75 and a locking hole portion 76. The locking claw 75 is provided in the electronic component 4. The locking hole portion 76 is provided in the connection box housing body 21 and is engageable with the locking claw 75.

The branch box housing 5 has a branch box housing body 51, which forms the branch box storing space 5s, and a branch box housing cover 52, as illustrated in FIG. 2. The branch box housing cover 52 opens or closes with respect to the branch box housing body 51 at the fully open position where the branch box bus bar 6 is exposed to the outside and the fully closed position where the branch box bus bar 6 is blocked from the outside. The electrical connection box 1 blocks the branch box bus bar 6 from the outside with respect to the branch box housing body 51 in a state where the branch box housing cover 52 moves to the fully closed position, and so the branch box bus bar 6 is not exposed as illustrated in FIGS. 1 and 2. On the other hand, the electrical connection box 1 exposes the branch box bus bar 6 to the outside with respect to the branch box housing body 51 in a state where the branch box housing cover 52 moves to the fully open position indicated by the imaginary line in FIG. 2.

The branch box housing body 51 has, as illustrated in FIGS. 2 and 3, a pair of first branch box housing-facing walls 51a, a pair of second branch box housing-facing walls 51b, and a branch box housing bottom portion 51c. The pair of first branch box housing-facing walls 51a faces each other in the first orthogonal direction X. The pair of second branch box housing-facing walls 51b faces each other in the second orthogonal direction Y. The branch box housing bottom portion 51c faces a cover body 52a described later of the branch box housing cover 52 at the fully closed position in the vertical direction Z One first branch box housing-facing wall 51a of the pair of first branch box housing-facing walls 51a is provided with two first facing wall portion through-holes 51ch. Each first facing wall portion through-hole 51ch penetrates the first branch box housing-facing wall 51a in the second orthogonal direction Y to communicate the branch box storing space 5s with the outside.

The branch box housing cover 52 has the cover body 52a and a cover protrusion 52b that protrudes downward from one end of the cover body 52a in the second orthogonal direction Y as illustrated in FIG. 1. The cover protrusion 52b extends along the first orthogonal direction X. More specifically, the cover protrusion 52b extends to a position overlapping a part of the first connector 36 in the first orthogonal direction X when viewed from above in the vertical direction Z from one end of the cover protrusion 52b in the first orthogonal direction X provided with a rotation support mechanism 9.

The electrical connection box 1 according to the present embodiment is provided with the rotation support mechanism 9 that supports in such a manner that the branch box housing cover 52 is rotated around a rotation shaft 9x with respect to the branch box housing body 51 between the branch box housing body 51 and the branch box housing cover 52 as illustrated in FIG. 1. In the rotation support mechanism 9 according to the present embodiment, the rotation shaft 9x extends in the second orthogonal direction Y. Then, the rotation support mechanism 9 includes a cylindrical portion 91 and a support receiving portion 92. The cylindrical portion 91 is provided on the branch box housing cover 52, and the support receiving portion 92 is provided on the branch box housing body 51 and supports in such a manner that the cylindrical portion 91 is rotated around the rotation shaft 9x. The rotation support mechanism 9 according to the present embodiment is, for example, a hinge.

Then, in the electrical connection box 1, the branch box bus bar 6 is exposed to the outside in the state where the branch box housing cover 52 opens with respect to the branch box housing body 51. On the other hand, in the electrical connection box 1, the branch box bus bar 6 closes inside the branch box storing space 5s, and so the branch box bus bar 6 is not exposed to the outside in the state where the branch box housing cover 52 closes with respect to the branch box housing body 51.

Furthermore, the branch box housing 5 has a leg portion 53 extending from the upper side to the lower side of the branch box housing body 51 in the vertical direction Z as illustrated in FIG. 3.

The branch box bus bar 6 includes the first branch box bus bar 61 and the second branch box bus bar 62 as illustrated in FIG. 6.

The first branch box bus bar 61 has one tip portion 61a with a through-hole penetrating the tip portion 61a in the vertical direction Z. Then, the tip portion 61a is brought into direct contact with an electric wire terminal W2a provided at one end of the electric wire W2 described above. Each electric wire terminal W2a has a terminal through-hole W2ah penetrating the terminal W2a in the vertical direction Z. Then, a screw portion 841 of a fourth bolt 84a in an electric wire fastening member 84 is inserted into the through-hole of the tip portion 61a and the terminal through-hole W2ah, and so the tip portion 61a of the first branch box bus bar 61 and the wire terminal W2a are brought into direct contact with each other. In this state, screwing the screw portion 841 of the fourth bolt 84a into a screw hole 842 of a fourth nut 84b fastens the tip portion 61a of the first branch box bus bar 61 to the electric wire terminal W2a provided in one end of the electric wire W2 together by using the electric wire fastening member 84.

The other tip portion 61b of the first branch box bus bar 61 has a through-hole 61bh penetrating the tip portion 61b in the vertical direction Z (see FIG. 4). Then, the tip portion 61b of the first branch box bus bar 61 and the tip portion 32b of the second connection box bus bar 32 are electrically connected by fastening them together using the first bus bar fastening member 81 in a state where they are brought into direct contact with each other.

The tip portion 61a of the first branch box bus bar 61 is located inside the branch box storing space 5s. In addition, the first branch box bus bar 61 is inserted through one of the first facing wall portion through-holes 51ch, and so a part of the first branch box bus bar 61 is located outside. The first branch box bus bar 61 is inserted through one of the top through-holes 21ch, and so the other tip portion 61a of the first branch box bus bar 61 is located inside the connection box storing space 2s. Thus, a part of the first branch box bus bar 61 is exposed to the outside, but in the part exposed to the outside, another device is arranged adjacent to the electrical connection box 1 in the vehicle, so the operator does not touch the part of the first branch box bus bar 61 exposed to the outside.

The second branch box bus bar 62 has one tip portion 62a with a through-hole penetrating the tip portion 62a in the vertical direction Z. Then, the tip portion 62a is brought into direct contact with an electric wire terminal W2a provided at one end of the electric wire W2 described above. Each electric wire terminal W2a has a terminal through-hole W2ah penetrating the terminal W2a in the vertical direction Z. Then, a screw portion 841 of a fourth bolt 84a in an electric wire fastening member 84 is inserted into the through-hole of the tip portion 62a and the terminal through-hole W2ah, and so the tip portion 62a of the second branch box bus bar 62 and the wire terminal W2a are brought into direct contact with each other. In this state, screwing the screw portion 841 of the fourth bolt 84a into a screw hole 842 of a fourth nut 84b fastens the tip portion 62a of the second branch box bus bar 62 to the electric wire terminal W2a provided in one end of the electric wire W2 together by using the electric wire fastening member 84.

The other tip portion 62b of the second branch box bus bar 62 has a through-hole 62bh penetrating the tip portion 62b in the vertical direction Z (see FIG. 3). Then, the tip portion 62b of the second branch box bus bar 62 and the tip portion 33b of the third connection box bus bar 33 are electrically connected by fastening them together using the second bus bar fastening member 82 in a state where they are brought into direct contact with each other.

The tip portion 62a of the second branch box bus bar 62 is located inside the branch box storing space 5s. In addition, the second branch box bus bar 62 is inserted through the other first facing wall portion through-hole, and so a part of the second branch box bus bar 62 is located outside. The second branch box bus bar 62 is inserted through the other top through-hole 21ch, and so the other tip portion 62b of the second branch box bus bar 62 is located inside the connection box storing space 2s. Thus, a part of the second branch box bus bar 62 is exposed to the outside, but in the part exposed to the outside, another device is arranged adjacent to the electrical connection box 1 in the vehicle, so the operator does not touch the part of the second branch box bus bar 62 exposed to the outside.

In the electrical connection box 1, the electrical connection between the components as described above enables the power supply P and the first electronic device D1 to be electrically connected and the power supply P and the second electronic device D2 to be electrically connected in the state where the first electronic component 41 is interposed. Then, in the electrical connection box 1, the first electronic device D1 or the second electronic device D2 is supplied with the electric power from the power supply P by turning on a switch of the first electronic component 41 on the basis of a command from the ECU provided in the vehicle. In addition, in the electrical connection box 1, the power supply from the power supply P to the first electronic device D1 or the second electronic device D2 is cut off by turning off the switch of the first electronic component 41 on the basis of the command from the ECU provided in the vehicle.

In the electrical connection box 1, the electrical connection between the components as described above enables the power supply P and the third electronic device D3 to be electrically connected and the power supply P and the fourth electronic device D4 to be electrically connected in the state where the second electronic component 42 is interposed. Then, in the electrical connection box 1, the third electronic device D3 or the fourth electronic device D4 is supplied with the electric power from the power supply P by turning on a switch of the second electronic component 42 on the basis of a command from the ECU provided in the vehicle. In addition, in the electrical connection box 1, the power supply from the power supply P to the third electronic device D3 or the fourth electronic device D4 is cut off by turning off the switch of the second electronic component 42 on the basis of the command from the ECU provided in the vehicle.

The electrical connection box 1 has a restriction portion 7, which is provided in the branch box housing cover 52 and restricts the power supply line W1 from moving in the longitudinal direction. More specifically, in the electrical connection box 1, the restriction portion 7 is provided on the cover protrusion 52b of the branch box housing cover 52. The restriction portion 7 is arranged at a position deviated from the upper part of the first connector 36 in the first orthogonal direction X when viewed from above in the vertical direction Z. The restriction portion 7 includes a restriction portion body 71 attached to the branch box housing cover 52 and an annular portion 72 provided in the restriction portion body 71 and having a restriction portion space 7s. The restriction portion 7 is formed, for example, of an insulating synthetic resin. The restriction portion 7 of the present embodiment causes the tip of the annular portion 72 to be inserted into the hole provided in the restriction portion body 71. This changes the tip length of the annular portion 72 protruding from the hole, allowing changing the size of the restriction portion space 7s.

The electrical connection box 1 according to the present embodiment is provided with the restriction portion 7 only at one end of the branch box housing cover 52 in the first orthogonal direction X, but the electrical connection box 1 is not provided with the restriction portion 7 at the other end of the branch box housing cover 52 in the orthogonal direction X as illustrated in FIG. 1.

As illustrated in FIG. 2, the restriction portion 7 is located between the rotation shaft 9x and the first connector 36 when viewed from one side of the axial direction of the rotation shaft 9x.

The branch box housing cover 52 has an intermediate support portion 73 that supports a part of the power supply line W1 between the restriction portion 7 and the first connector 36 when viewed from one side of the axial direction of the rotation shaft 9x at the fully closed position. The intermediate support portion 73 is provided on the cover protrusion 52b. More specifically, the intermediate support portion 73 is provided at the lower end of the cover protrusion 52b in the vertical direction Z and protrudes outward in the first orthogonal direction X to be separated from the branch box storing space 5s. Then, the width of the intermediate support portion 73 in the second orthogonal direction Y is larger than the diameter of the power supply line W1. The lower part of the power supply line W1 is brought into contact with the upper surface of the intermediate support portion 73, allowing the intermediate support portion 73 to support the power supply line W1. The branch box housing cover 52 according to the present embodiment includes the cover body 52a, the cover protrusion 52b, and the intermediate support portion 73 in an integral form.

One end of both ends of the intermediate support portion 73 that is separated from the rotation support mechanism 9 in the first orthogonal direction is located above the first connector 36 in the vertical direction. Thus, at the initial stage of moving the branch box housing cover 52 from the fully closed position to the fully open position, the first terminal W1a is pulled upward.

The operator's work of restricting the power supply line W1 from moving in the longitudinal direction by the restriction portion 7 is now described. The operator first shifts the branch box housing cover 52 to the fully closed position with respect to the branch box housing body 51.

Next, the operator inserts one end of the power supply line W1 in the longitudinal direction into the restriction portion space 7s. In this state, the operator attaches the first terminal W1a to one end of the power supply line W1 in the longitudinal direction.

Then, the operator attaches the first terminal W1a to the first connector 36. Next, the operator pulls the power supply line W1 toward the side of the power supply P at a part of the power supply line W1 that is separated from between the restriction portion 7 and the first terminal W1a (i.e., a part of the power supply line W1 that is closer to the power supply P than the restriction portion 7). This allows the power supply line W1 from the restriction portion 7 to the first terminal W1a to have a part extending in the first orthogonal direction X and a part extending in the vertical direction Z.

Subsequently, the operator slightly loosens the power supply line W1 from the restriction portion 7 to the first terminal W1a by a preset extra length for attaching or detaching the first terminal W1a to or from the first connector 36. In this state, the operator inserts the tip of the annular portion 72 into the hole of the restriction portion body 71 described above to shorten the tip length of the annular portion 72 that protrudes from the hole. Accordingly, the inner peripheral surface of the annular portion 72 is brought into contact with the outer peripheral surface of the power supply line W1, and the annular portion 72 is wound around the power supply line W1, so the restriction portion 7 and the power supply line W1 are integrated. Then, in the state where the restriction portion 7 and the power supply line W1 are integrated, the restriction portion 7 restricts the power supply line W1 from moving in the longitudinal direction. The movement of the power supply line W1 in the longitudinal direction is restricted by the restriction portion 7 as described above. Thus, if the branch box housing cover 52 is tried to move from the fully closed position to the fully open position side in the state where the first terminal W1a is connected to the first connector 36, tension is created on the power supply line W1 by the restriction portion 7 in the length direction during the movement. Thus, the branch box housing cover 52 fails to move to the fully open position with respect to the branch box housing body 51.

In the power supply line W1, the extra length that is preset for attaching or detaching the first terminal W1a to or from the first connector 36 is a length at which a gap of up to approximately 10 mm is formed between the branch box housing body 51 and the branch box housing cover 52 at the end on the opposite direction to the end on one side where the rotation support mechanism 9 is provided in the first orthogonal direction X. Thus, the finger of the operator is prevented from being inserted through the gap between the branch box housing body 51 and the branch box housing cover 52.

The length from the restriction portion 7 to the first terminal W1a in the power supply line W1 is set to a length that allows the first terminal W1a to be attached to the first connector 36 when the branch box housing cover 52 moves to the fully closed position. Furthermore, the length from the restriction portion 7 to the first terminal W1a in the power supply line W1 is set to a length that prevents the first terminal W1a from attaching to the first connector 36 in the state the branch box housing cover 52 moves to the fully open position.

More specifically, the length from the restriction portion 7 to the first terminal W1a in the power supply line W1 is described. The electrical connection box 1 is located on the side of the first terminal W1a from the restriction portion 7 illustrated in FIG. 2, and the length of the power supply line W1 extending in the first orthogonal direction X is set to L1. In addition, the electrical connection box 1 is located on the side of the first terminal W1a from the restriction portion 7, and the length of the power supply line W1 extending in the vertical direction Z is set to L2. Furthermore, in the electrical connection box 1, the extra length for attaching or detaching the first terminal W1a to or from the first connector 36 in the power supply line W1 is set to L3. These settings show that the length L from the restriction portion 7 to the first terminal W1a in the power supply line W1 is the sum of L1, L2, and L3.

If the branch box housing cover 52 moves from the fully closed position to the fully open position without providing the restriction portion 7 in the electrical connection box 1, the movement of the branch box housing cover 52 also causes the restriction portion 7 to rotate around the rotation shaft 9x of the rotation support mechanism 9. Then, if the operator forgets to detach the first terminal W1a from the first connector 36 before shifting the branch box housing cover 52, the power supply line W1 also moves together with the restriction portion 7. Then, suppose that the length from the restriction portion 7 to the first terminal W1a in the power supply line W1 is L4 (not illustrated) in the state where the branch box housing cover 52 moves to the fully open position (the state indicated by the imaginary line in FIG. 2). In that case, the length L of the power supply line W1 according to the present embodiment is represented by the following equation.

$$L4 > L = L1 + L2 + L3$$

A lock mechanism (not illustrated) is provided between the branch box housing cover 52 and the branch box housing body 51. The lock mechanism includes a lock claw and an engaging concave portion that is engageable with the lock claw. Then, in the lock mechanism, one of the lock claw and the engaging concave portion is provided on the branch box housing cover 52, and the other is provided on the branch box housing body 51.

Next, the opening or closing operation of the branch box housing cover 52 in the electrical connection box 1 is described. In the state where the branch box housing cover 52 moves to the fully closed position with respect to the branch box housing body 51, tension is not applied to the power supply line W1 in the longitudinal direction. In the present embodiment, the tension with respect to the power supply line W1 is the force for extending the power supply line W1 in the longitudinal direction.

The operator first detaches the first terminal W1a from the first connector 36, next disengages the lock claw from the engaging concave portion in the locking mechanism. After that, the operator rotates the branch box housing cover 52 at the fully closed position around the rotation shaft 9x to move it to the fully open position and exposes the branch box bus bar 6 to the outside.

Even if the operator forgets to detach the first terminal W1a from the first connector 36, the electrical connection box 1 according to the present embodiment has the restriction portion 7 that creates tension on the power supply line W1 during the movement of the branch box housing cover 52 from the fully open position to the fully closed position. Thus, the electrical connection box 1 according to the present embodiment is restricted from moving the branch box housing cover 52 to the fully open position side beyond a predetermined position.

Subsequently, the operator performs maintenance or inspection on the branch box housing 5 with the branch box bus bar 6 exposed to the outside. In one example, the operator brings the tip of a detection rod of a tester into contact with the branch box bus bar 6 to measure the resistance value or the like of the branch box bus bar 6.

After performing maintenance or inspection of the branch box housing 5, the operator rotates the branch box housing cover 52 in the fully open position around the rotation shaft 9x to move it to the fully closed position. Then, the operator stores the branch box bus bar 6 inside the branch box storing space 5s by the branch box housing cover 52, which prevents the branch box bus bar 6 from being exposed to the outside. After that, the operator engages an engaging claw with the engaging concave portion in the lock mechanism, and then attaches the first terminal W1a to the first connector 36, which allows the electric voltage from the power supply P to be supplied to the power supply line W1, the connection box bus bar 3, the branch box bus bar 6, the electric wire W2, and the electronic device D.

The electrical connection box 1 according to the present embodiment has the following configuration. The electrical connection box 1 is provided with the conductive bus bar B, the insulating housing body MH, the branch box housing cover 52, and the power supply line W1. The insulating housing body MH stores the bus bar B in the internal storing space 5s, and the branch box housing cover 52 opens or closes with respect to the housing body MH at the fully open position where the bus bar B is exposed to the outside and the fully closed position where the bus bar B is blocked from the outside. The power supply line W1 supplies the bus bar B with the electric power. In addition, in the state where the first terminal W1a is connected to the first connector 36, the tension is created on the power supply line W1 in the longitudinal direction by the restriction portion 7 during moving the branch box housing cover 52 from the fully closed position to the fully open position side. Thus, the electrical connection box 1 according to the present embodiment creates the tension on the power supply line W1 in the longitudinal direction during moving along the rotational trajectory between the fully closed position and the fully open position in the branch box housing cover 52 in the case where the branch box housing cover 52 moves from the fully closed position to the fully open position in the state where the first terminal W1a is connected to the first connector 36. This restricts the branch box housing cover 52 from moving to the side of the fully open position. Thus, the electrical connection box 1 according to the present embodiment restricts the cover from moving to the fully open position in the state where the first terminal W1a is connected to the first connector 36. On the other hand, the electrical connection box 1 enables the branch box housing cover 52 to move the fully open position in the state where the first terminal W1a is not connected to the first connector 36. Thus, the electrical connection box 1 according to the present embodiment is capable of restricting the branch box housing cover 52 from moving to the fully open position depending on the connection state between the first terminal W1a and the first connector 36.

The electrical connection box 1 according to the present embodiment has the following configuration. The restriction portion 7 is located between the rotation shaft 9x and the first connector 36 when viewed from one side of the axial direction of the rotation shaft 9x. Thus, the electrical connection box 1 according to the present embodiment is capable of preventing a power supply line W1M1 from getting longer than necessary in the longitudinal direction as compared with the case where the restriction portion 7 is provided at a position deviated from between the rotation shaft 9x and the first connector 36 when viewed from one side of the axial direction of the rotation shaft 9x.

The electrical connection box 1 according to the present embodiment has the following configuration. The branch box housing cover 52 has an intermediate support portion 73 that supports a part of the power supply line W1 between the restriction portion 7 and the first connector 36 when viewed from one side of the axial direction of the rotation shaft 9x at the fully closed position. Thus, in the electrical connection box 1 according to the present embodiment, the intermediate support portion 73 enables the occurrence of slack in the power supply line W1 to be reduced or prevented. Thus, the electrical connection box 1 according to the present embodiment enables the tension to occur in the longitudinal direction of the power supply line W1M1 at the initial stage of moving the branch box housing cover 52 from the fully open position to the fully closed position. Accordingly, the electrical connection box 1 according to the present embodiment is capable of narrowing the gap between the branch box housing body 51 and the branch box housing cover 52 as much as possible.

The electrical connection box 1 according to the present embodiment is provided with the restriction portion 7 only at one end of the branch box housing cover 52 in the first orthogonal direction X, but the electrical connection box 1 is not provided with the restriction portion 7 at the other end of the branch box housing cover 52 in the orthogonal direction X as illustrated in FIG. 1. Even if the branch box housing cover 52 is provided with restriction portions 7 that restricts the power supply line W1 from moving in the longitudinal direction at both ends of the first orthogonal direction X, the restriction portion 7, which occurs the tension with respect to the power supply line W1 when the branch box housing cover 52 in the fully closed position moves to the fully open position, is one of the two restriction portions 7. Thus, the restriction portion 7 can be provided only in one side of the first orthogonal direction X, reducing the materials required for manufacturing the restriction portion 7.

The electrical connection box 1 according to the present embodiment has the following configuration. The electrical connection box 1 includes the connection box bus bar 3, the branch box bus bar 6, and the branch box housing cover 52. The connection box bus bar 3 is stored in the connection box housing body 21, the branch box bus bar 6 is stored in the branch box housing body 51, and the branch box housing cover 52 opens or closes with respect to the branch box housing body 51 at the fully open position where the branch box bus bar 6 is exposed to the outside and the fully closed position where the branch box bus bar 6 is blocked from the outside. Then, in a normal condition, the connection box bus bar 3 is stored inside the connection box housing body 21 and is not exposed to the outside. Thus, the electrical connection box 1 according to the present embodiment stores the branch box bus bar 6 having many opportunities for maintenance or inspection in the branch box housing body 51 but stores the connection box bus bar 3 having few opportunities for maintenance or inspection in the connection box housing body 21. Accordingly, the electrical connection box 1 according to the present embodiment is capable of performing easily the maintenance or inspection of the branch box bus bar 6, reducing or preventing the connection box bus bar 3 from being exposed to the outside.

Second Embodiment

An electrical connection box 1A according to a second embodiment is now described with reference to FIG. 7. The electrical connection box 1A according to the second embodiment is different from the electrical connection box 1 according to the first embodiment in that the branch box housing cover 52 does not have the intermediate support portion 73. The electrical connection box 1A according to the second embodiment is now described regarding the differences from the electrical connection box 1 according to the first embodiment.

Further, a cover protrusion 52b of a branch box housing cover 52A is arranged above one leg portion 53 of four leg portions 53 in the vertical direction Z. Then, the cover protrusion 52b according to the second embodiment in the first orthogonal direction X is narrower in width than the cover protrusion 52b according to the first embodiment in the first orthogonal direction X.

Figure 7:
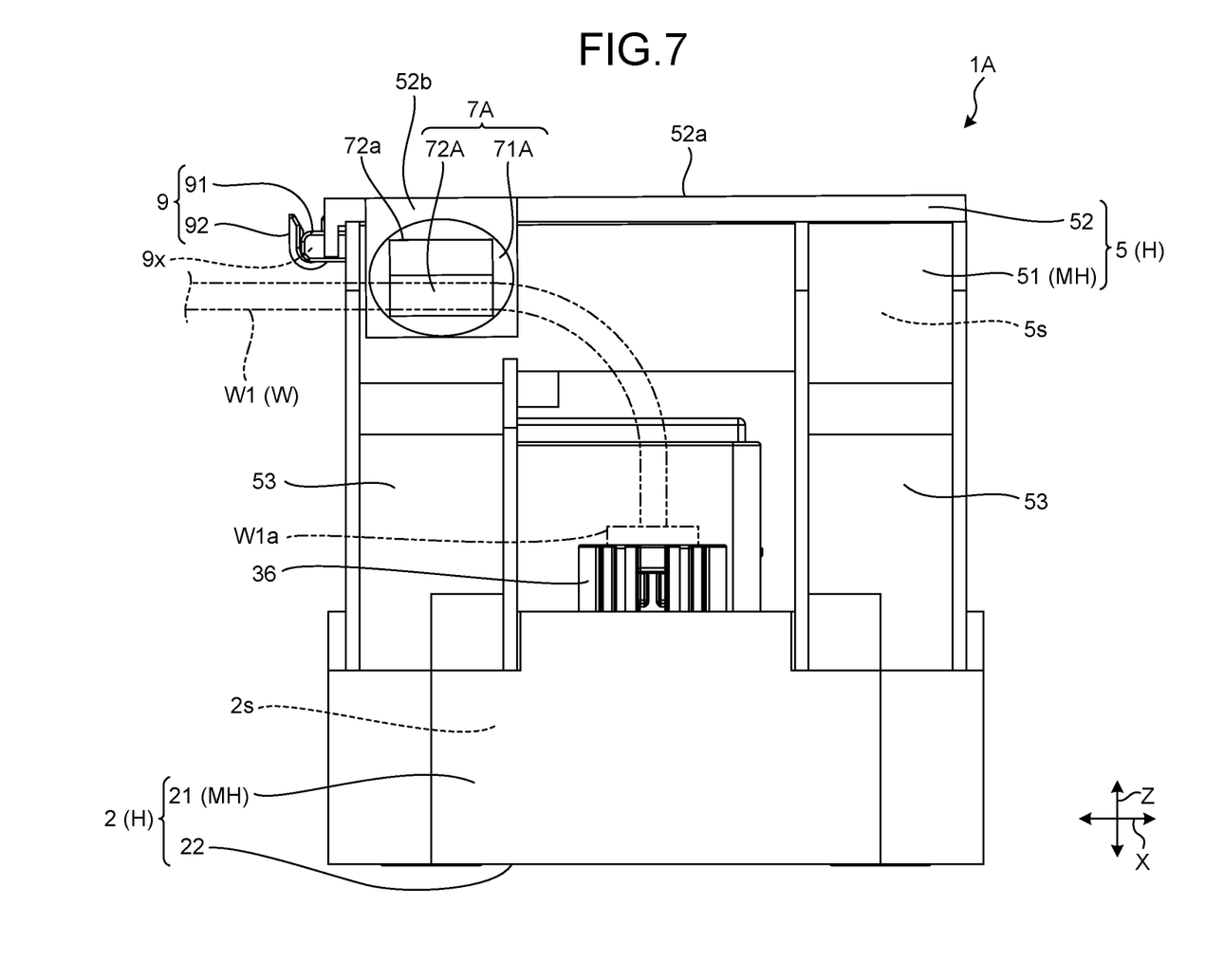
FIG. 7 is a side view of the electrical connection box according to a second embodiment in a state where a branch box housing cover moves to a fully closed position with respect to a branch box housing body.

The power supply line W1 according to the present embodiment extends from the upper surface of the first connector 36 along the vertical direction Z, gently bends toward the left side in FIG. 7, and then is held by a restriction portion 7A. The power supply P side of the power supply line W1 held by the restriction portion 7A extends along the first orthogonal direction X in FIG. 7.

The electrical connection box 1A according to the present embodiment has the following configuration. The branch box housing cover 52A is not provided with the intermediate support portion 73. Thus, it is possible for the electrical connection box 1A according to the present embodiment to reduce the materials for manufacturing the branch box housing cover 52.

Third Embodiment

Figure 8:
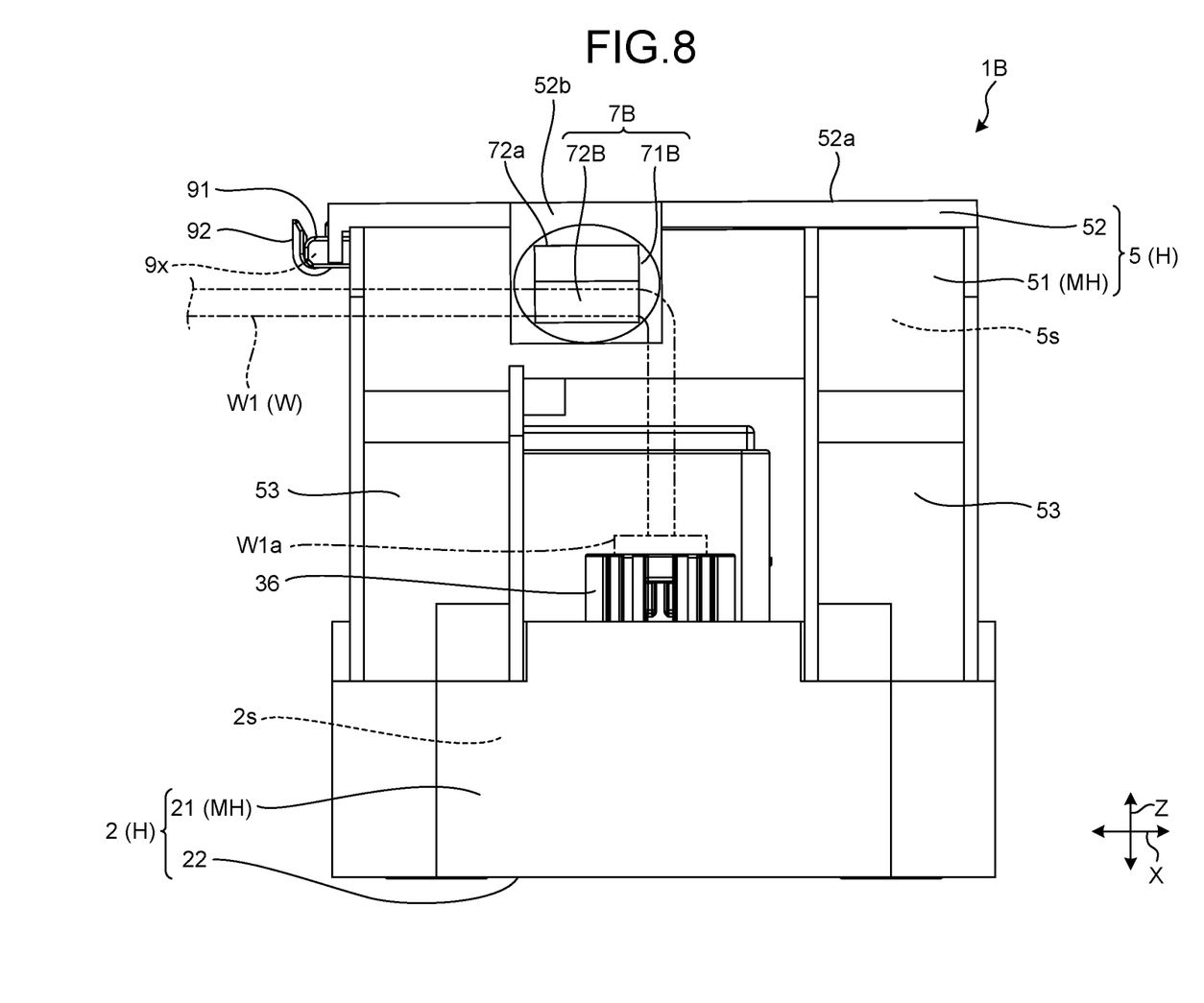
FIG. 8 is a side view of the electrical connection box according to a third embodiment in a state where a branch box housing cover moves to a fully closed position with respect to a branch box housing body.

An electrical connection box 1B according to a third embodiment is now described with reference to FIG. 8. The electrical connection box 1B according to the third embodiment is different from the electrical connection box 1 according to the first embodiment in that the branch box housing cover 52 does not have the intermediate support portion 73. The electrical connection box 1B according to the third embodiment is now described regarding the differences from the electrical connection box 1 according to the first embodiment.

Further, the cover protrusion 52b of a branch box housing cover 52B is located between the two leg portions 53 in the first orthogonal direction X and above the first connector 36. Then, the cover protrusion 52b according to the second embodiment in the first orthogonal direction X is narrower in width than the cover protrusion 52b according to the first embodiment in the first orthogonal direction X.

The power supply line W1 according to the present embodiment extends from the upper surface of the first connector 36 along the vertical direction Z, and then is held by a restriction portion 7B. The power supply P side of the power supply line W1 held by the restriction portion 7B extends along the first orthogonal direction X in FIG. 8.

The electrical connection box 1B according to the present embodiment has the following configuration. The branch box housing cover 52A is not provided with the intermediate support portion 73. Thus, it is possible for the electrical connection box 1B according to the present embodiment to reduce the materials for manufacturing the branch box housing cover 52.

Moreover, in the electrical connection box 1 according to the embodiment described above, the connection box housing 2 is arranged below in the vertical direction Z, while the branch box housing 5 is arranged above the connection box housing 2 in the vertical direction Z. However, the electrical connection box 1 according to the present embodiment is not limited to this exemplary configuration, and the housings can be integrally formed.

In addition, in the electrical connection box 1 according to the embodiment described above, the connection box housing 2 is arranged below in the vertical direction Z, while the branch box housing 5 is arranged above the connection box housing 2 in the vertical direction Z. However, the electrical connection box 1 according to the present embodiment is not limited to this exemplary configuration, and the branch box housing 5 may be arranged below in the vertical direction Z, while the connection box housing 2 may be arranged above the branch box housing 5 in the vertical direction Z.

Further, in the rotation support mechanism 9 according to the embodiment described above, the branch box housing body 51 is provided with the cylindrical portion 91, while the branch box housing cover 52 is provided with the support receiving portion 92. However, the rotation support mechanism 9 according to the present embodiment is not limited to this exemplary configuration. In one example, in the rotation support mechanism 9 according to the present embodiment, the branch box housing body 51 may be provided with the support receiving portion 92, while the branch box housing cover 52 may be provided with the cylindrical portion 91.

According to the present embodiment, the electrical connection box having the configuration described above is capable of restricting the cover from moving to the fully open position depending on the connection state between the terminal and the connector.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electrical connection box comprising:
 a bus bar having conductivity;
 a housing body having an insulation property configured to store the bus bar in a storing space inside the housing body;
 a cover configured to open or close with respect to the housing body at a fully open position where the bus bar is exposes to outside and a fully closed position where the bus bar is blocked from the outside; and
 a power supply line configured to supply the bus bar with electric power, wherein
 the housing body has a connector provided at a position exposed to the outside, the connector being configured so that a terminal provided at a tip of the power supply line is attachable or detachable to or from the connector,
 the cover is provided with a restriction portion that restricts the power supply line from moving in a longitudinal direction, and
 tension is created on the power supply line in the longitudinal direction by the restriction portion during moving the cover from the fully closed position to the fully open position side in a state where the terminal is connected to the connector.

2. The electrical connection box according to claim 1, wherein
 the cover is supported to be openable and closable around a rotation shaft with respect to the housing body, and
 the restriction portion is located between the rotation shaft and the connector in a case of being viewed from one side of an axial direction of the rotation shaft.

3. The electrical connection box according to claim 2, wherein
 the cover has an intermediate support portion that supports a part of the power supply line between the restriction portion and the connector in a case of being viewed from one side of the axial direction of the rotation shaft at the fully closed position.

* * * * *